United States Patent [19]
Barnes

[11] Patent Number: 5,753,112
[45] Date of Patent: May 19, 1998

[54] MAIN DRAIN LEAF REMOVAL SYSTEM FOR POOLS

[75] Inventor: Steven R. Barnes, Phoenix, Ariz.

[73] Assignee: Caretaker Systems, Inc., Scottsdale, Ariz.

[21] Appl. No.: 796,069

[22] Filed: Nov. 20, 1991

[51] Int. Cl.⁶ .................................................. E04H 3/16
[52] U.S. Cl. .................... 210/169; 210/416.2; 4/507
[58] Field of Search ............................ 210/169, 416.2, 210/162, 163; 4/490, 507; 15/1.7

[56] References Cited

U.S. PATENT DOCUMENTS

| | | |
|---|---|---|
| 2,247,116 | 6/1941 | Day . |
| 3,252,576 | 5/1966 | Miller . |
| 3,506,489 | 4/1970 | Baker . |
| 3,932,281 | 1/1976 | Pansini . |
| 3,977,027 | 8/1976 | Speck . |
| 4,501,659 | 2/1985 | Henk . |
| 4,705,629 | 11/1987 | Weir et al. . |
| 4,722,670 | 2/1988 | Zweifel . |
| 4,818,389 | 4/1989 | Tobias et al. . |
| 4,826,591 | 5/1989 | Macia . |
| 4,997,558 | 3/1991 | Baker ....................................... 210/169 |

*Primary Examiner*—Robert J. Popovics
*Attorney, Agent, or Firm*—LaValle D. Ptak

[57] ABSTRACT

An improved leaf removal system is disclosed for removing leaves and the like through the floor drain of a swimming pool, conventional recirculation system for the pool. This is accomplished by providing a leaf removal chamber adjacent the pool, with a water outlet from the bottom of the chamber to the pool. The floor drain is interconnected by means of a pipe to a water inlet near the upper end of the chamber, and this inlet is located beneath the water level of the pool. A strainer basket is removably placed between the water inlet and the water outlet in the chamber. Return water for the pool is supplied to an entrainment nozzle connected to the water outlet in the chamber to cause a venturi effect to draw water, along with leaves and other debris, from the floor drain into the water inlet of the chamber, from which such water is returned to the pool, along with return water supplied to the entrainment nozzle. In this manner, the leaves and other debris are removed from the pool without passing them into or through the pool recirculation system.

18 Claims, 2 Drawing Sheets

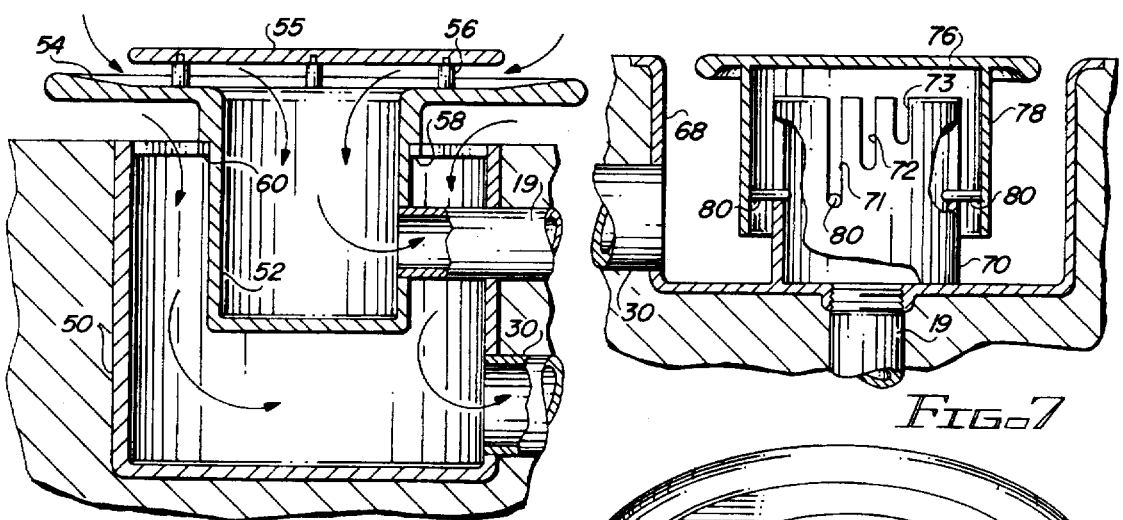
FIG.5
FIG.7
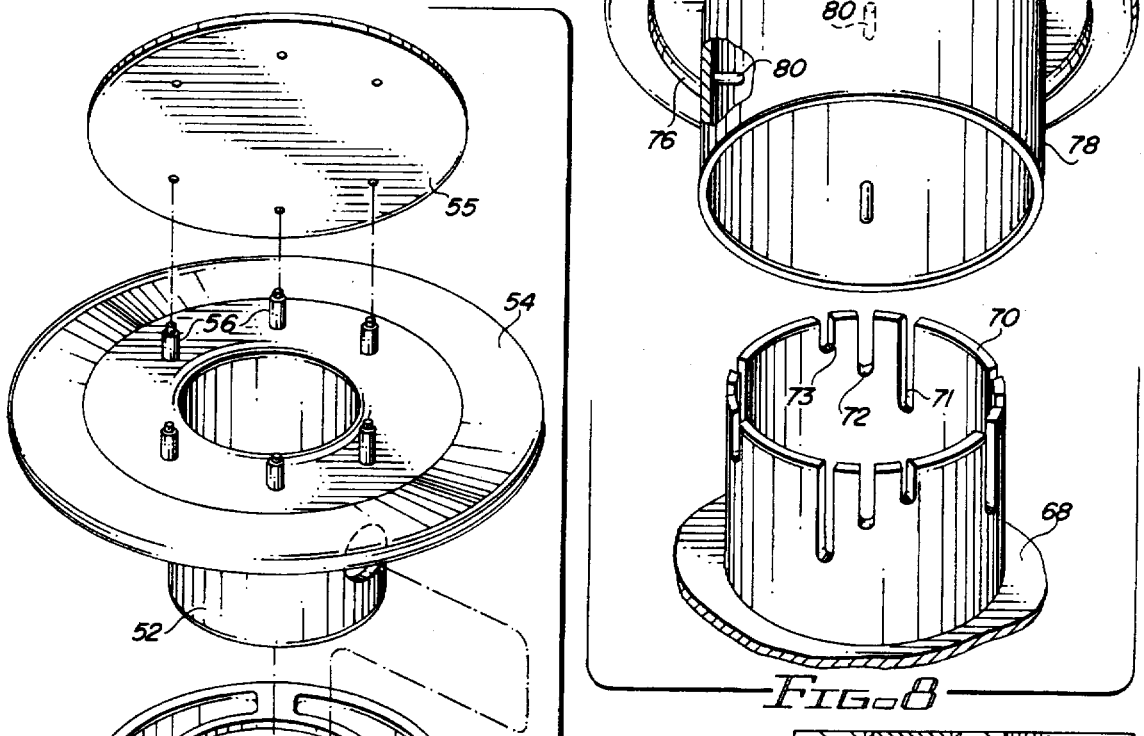
FIG.8
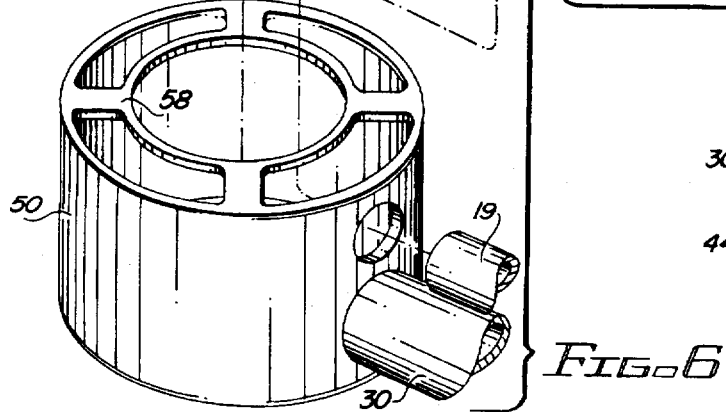
FIG.6
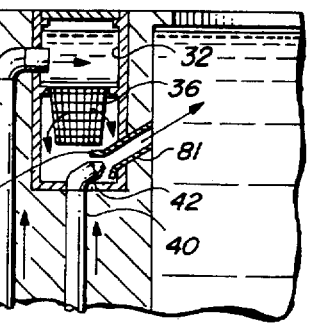
FIG.9

MAIN DRAIN LEAF REMOVAL SYSTEM FOR POOLS

BACKGROUND

A major problem which exists with swimming pools and the like, both commercial and residential, is keeping such pools clean and free of dirt and debris. Leaves, bugs, feathers and other items accumulate on the surface of the water. If they are not removed from the surface, these items become saturated and sink to the bottom. Most modern swimming pools employ recirculating pump systems for withdrawing water from drains located at the bottom of the pool, and from skimmers located at the water's surface. This water then passes through a filter, which removes suspended particles from the water prior to returning the water to the pool after it has been filtered. Water circulation pumps for achieving this purpose operate for extended periods of time, in some cases continuously, throughout the life of the pool. In many systems, chemicals such as chlorine are injected into the return water for the pool, either prior to, or after filtering of the water has been effected.

Systems also have been developed for causing "automatic" cleaning of pools. The most recent and most effective automatic pool cleaning systems use pop-up cleaning heads in the floor and walls of the pool to eject water under high pressure, in relatively narrow streams, adjacent the pool surface to stir up any dirt and small particles, which otherwise would settle to the bottom or stick to the walls of the pool. This material is placed in suspension, where it is withdrawn through the drain and skimmer, for circulation through the filter of the recirculation system, as described above. Automatic in-floor pool cleaning systems have reached a highly sophisticated state, and are extremely effective in maintaining pool cleanliness, with one primary exception.

In-floor pool cleaning systems inherently do not have a capability of handling leaves and the like. As a result, a conventional leaf skimmer continues to be a necessary part of any pool system. Leaf skimmers typically are located in a wall or cavity adjacent the pool, and have an inlet, which is partially submerged and partly above the normal water level for the pool. The inlet has a one-way pivoted floating dam in it to permit water and leaves to pass into the leaf skimmer; but the dam prevents leaves and other debris from passing out of the skimmer and into the pool. In conventional pool systems, the surface water is caused to move from the pool into the skimmer by withdrawing at least a portion of the water for recirculation and filtering from the bottom of the skimmer, in addition to water withdrawn from the drain in the bottom of the pool. As a consequence, some of the water which flows through the recirculating pump is pulled through the skimmer and the skimmer leaf basket on a continuous basis.

Leaves and other debris which are pulled into the leaf basket tend to plug up the openings in the basket and restrict the water flow through it. Thus, it is necessary periodically to empty the leaf basket to prevent substantial restriction of the water flow through it. This is particularly important if part of the recirculation water flow for the pool necessarily is withdrawn from the bottom of the cavity in which the leaf basket is located. To prevent this restriction in the recirculating water flow of a swimming pool, a pool skimmer which does not require the flow through the leaf basket to also pass through the circulation system has been developed. This skimmer is shown in the patent to Macia U.S. Pat. No. 4,826,591.

The Macia system does not pull any of the water for the recirculation through the pool filter through the leaf basket. Instead, water, which is recirculating in the pool from the return line of the water recirculation system, is discharged into an entrainment nozzle located beneath the basket in the skimmer. This entrainment nozzle then pulls additional water through the basket from the top of the pool to mix with the water returned from the water circulation return to produce circulation of water from the surface of the pool into the basket, and then back out into the pool. If the basket becomes clogged with leaves, however, no diminishment of the recirculation water flow takes place, since that water flow is not dependent upon the water which passes through the leaf basket. This constitutes a substantial improvement in swimming pool skimmers, and also minimizes the possibility of damage to the pump of the recirculation system, which otherwise might result from insufficient water flow through the pump.

The system of Macia, however, even when it is used in conjunction with a pop-up head in-floor cleaning system for a pool, still does not always result in the removal of all of the sunken debris in a pool, such as leaves and similar items. This debris tends to ultimately end up at the main drain of the pool, and either stays there until it is vacuumed out of the pool, or it passes from the main drain into the recirculation system of the pool. Because this does occur, most swimming pool recirculation systems include a secondary leaf trap, or debris trap, in the suction line from the main drain of the pool. This trap usually is located just in front of the inlet to the suction pump or recirculating pump for the pool. This trap or filter also periodically must be emptied to prevent it from becoming clogged and inhibiting the flow of water through the recirculation line of the pool.

Two other types of venturi skimmers, similar to the skimmer of the Macia U.S. Pat. No. 4,826,591, are disclosed in U.S. Pat. No. 4,501,659 and the patent to Tobias U.S. Pat. No. 4,818,389. Both of these skimmers, however, operate much on the same principle as the Macia skimmer, but are directed to different structural details. Neither of these devices have any provision for removing leaves and similar debris, which enters the main drain of the pool.

The patent to Day U.S. Pat. No. 2,247,116 is directed to a venturi return pool system, with supplemental inlets located about the periphery of the pool, for mixing recirculated and treated water from the pool with untreated water drawn from a different part of the pool than from which the recirculated water was drawn. This is intended to improve the circulation of water in the pool, and to facilitate the mixing of treated water with untreated water to increase the effectiveness of the chemical treatment of the water. This patent, however, does not deal with the problem of debris accumulating at or passing through the main drain of the system. In fact, in Day, any debris which is drawn into the main drain of the pool passes into the recirculating pump/filter system of the pool, and must be removed in the same manner described above. If such debris is not removed, constriction of the water flow through the recirculation path occurs, and possible damage to the pump can result.

It is desirable to provide an improved system for removing leaves and similar debris from the main drain of a pool without passing such leaves and debris through the pump/filter recirculation system of the pool.

SUMMARY OF THE INVENTION

Accordingly, it is an object of this invention to provide an improved debris removal system for pools.

It is another object of this invention to provide an improved leaf and debris removal system for removing such debris from the main drain of a pool.

It is an additional object of this invention to provide an improved system for removing leaves and other debris from the main drain of a pool without passing such debris through the recirculation water lines of the pool.

It is a further object of this invention to provide a venturi or entrainment system for removing leaves and other debris from the main drain of a pool.

In accordance with a preferred embodiment of this invention, an improved leaf and debris removal system is provided for pools having a floor mounted drain in them. A chamber is located, separate from the pool. This chamber has a water inlet located near its upper end, and a water outlet near its lower end. The water outlet communicates with the pool for delivery of water to the pool. A leaf and debris catching basket is located below the water inlet in the chamber, and with the bottom positioned above the water outlet. A water pipe is connected between the drain of the pool and the water inlet opening of the chamber. An entrainment nozzle is connected to the water outlet, and water from the recirculation system of the pool is supplied to the entrainment nozzle under pressure. The entrainment nozzle draws additional water from the drain through the water inlet of the chamber. This water then passes through the leaf catching basket, and is entrained with the water supplied under pressure, and discharged through the outlet in the bottom of the chamber to the pool. Leaves and other debris, which enter the drain in the bottom of the pool, are pulled along with the water from the drain to be deposited in the basket.

BRIEF DESCRIPTION OF THE DRAWINGS

FIG. 5 is a cross-sectional view of an alternative to the embodiment shown in FIG. 2;

FIG. 6 is an exploded view of the embodiment shown in FIG. 5;

FIG. 7 is a cross-sectional view of another alternative to the embodiments shown in FIGS. 2 and 5;

FIG. 8 is an exploded view of the embodiment shown in FIG. 7; and

FIG. 9 is a detail of a modification of a portion of the embodiment shown in FIG. 1.

DETAILED DESCRIPTION

Figure 1:
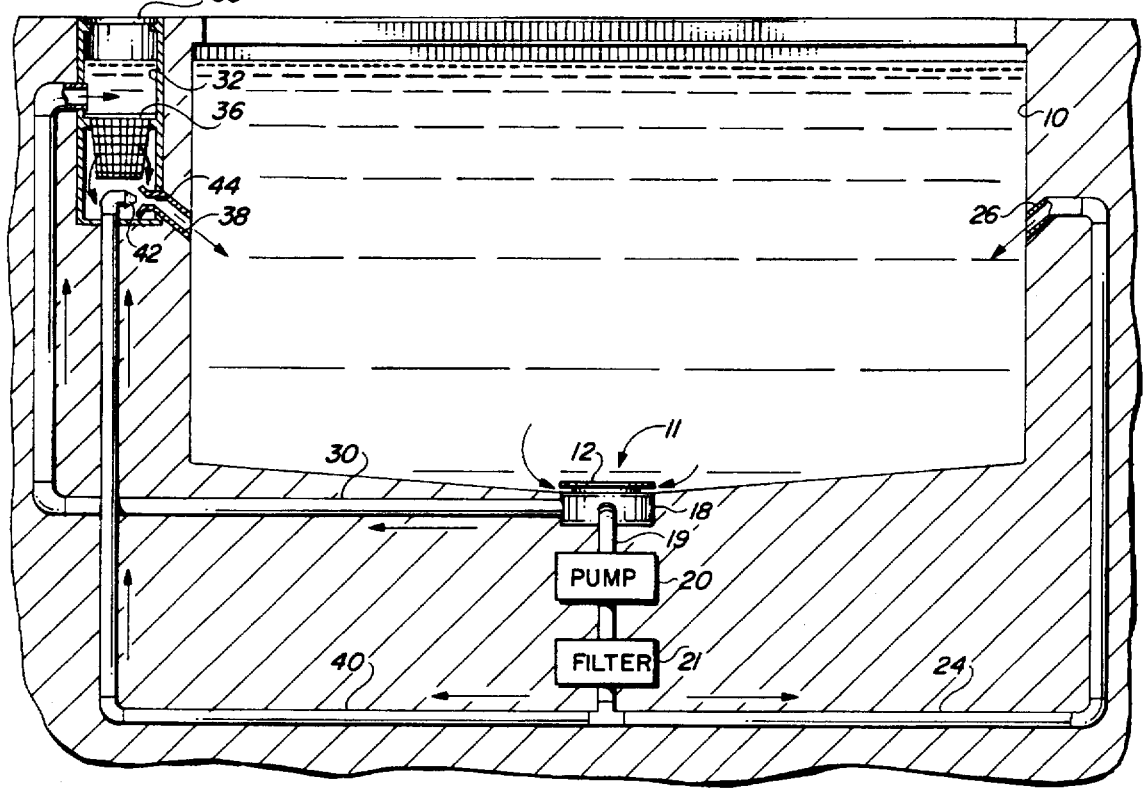
FIG. 1 is a diagrammatic cross-sectional view of a preferred embodiment of the invention.

Reference now should be made to the drawings, in which the same reference numbers are used in the different figures to designate the same components. Reference first should be made to FIG. 1, which is a diagrammatic representation of a preferred embodiment of the invention.

In FIG. 1, a typical swimming pool 10 is shown in cross section across its width. Such a pool typically has a drain 11 located in the bottom of the pool; and the bottom surface of the pool slopes gradually toward the drain 11. The drain 11, in the embodiment illustrated in FIG. 1, has a cap or cover 12 over it spaced upwardly from the floor of the pool 10 a slight distance. Flush with the floor of the pool is an open-topped outer chamber or compartment 18. This outer chamber preferably is a cylindrical chamber, as shown most clearly in FIGS. 3 and 4; and it has an inner chamber or compartment 14 located in it. The inner chamber also is a cylindrical open-topped chamber, shown most clearly in FIGS. 2, 3 and 4.

The cover 12 has a cylindrical flange 13 extending downwardly from it; so that when the cover 12 is located in position above the edge of the chamber 18 (as supported by spaced projections 16), the flange 13 extends downwardly over the upwardly extending walls 14 of the inner chamber a substantial distance. The inner chamber 14 has a circular opening 15 located in it in one side.

A pipe 19 extends through the wall of the outer chamber 18 and a slot 17 in the flange 13, and is connected with its open end in the opening 15 in the inner chamber 14.

The pipe 19 then is connected to a conventional pump 20 for a pool recirculation system. The pump 20 pulls water from the inner chamber 14, through the pipe 19, and supplies it to a filter 21 of the pool, from which it is then supplied back to the pool through a recirculation system, typically illustrated as the pipe 24 and the return 26, illustrated most clearly in FIG. 1. Of course, the recirculation system may include one or more banks of in-floor pop-up pool cleaning heads, or additional returns similar to the return 26. These different techniques for returning the water recirculated by the pump 20 in a pool are conventional, and for that reason, they have not been shown.

In addition to the return 26, which is representative of conventional pool returns, another return pipe 40 is provided. This pipe discharges in a nozzle 42, located in the bottom of a cylindrical chamber 32 positioned at one side of the pool, as shown in FIG. 1.

The chamber 32 typically extends from the deck or surface surrounding the pool 10 to a depth approximately 2½ feet to 3 feet deep. It has a lid 33 on its top to permit access to the interior. Approximately midway of the depth of the chamber 32 is a flange or shoulder, which is used to support a conventional leaf skimmer basket or filter basket 36, as illustrated in FIG. 1. The bottom of the basket 36 is located above the nozzle 42, which is directed to discharge water through a larger entrainment nozzle 44. The nozzle 44 is connected to the discharge 38 to return water to the pool through the discharge 38, much in the same manner that water is returned through the discharge 26 on the opposite side of the pool. It is to be noted in FIG. 1 that the discharges 26 and 38 are directed downwardly to move the returned water generally in the direction of the drain 11; so that any leaves or other debris on the bottom of the pool are directed toward the drain 11.

To facilitate the removal of leaves and other debris, such as dead bugs and the like, from the bottom of the pool, a pipe 30 is connected to draw water from the outer chamber or compartment 18 of the drain, and to supply this water to a discharge or inlet located above the top of the leaf and debris catching basket 36, as illustrated in FIG. 1. This water flow, however, does not take place through the recirculating pump 20 and filter 21, as is readily apparent from an examination of FIG. 1. It is separate from the pool recirculation system. This water flow, instead, is induced by the action of the nozzle 42 and the entrainment nozzle 44, which cause a venturi effect to draw a large quantity of water through the nozzle 44 in excess of that which is supplied through the pipe 40. This additional water is pulled from the drain outer housing or compartment 18 through the pipe 30 to pull such water along with leaves and other debris to the inlet located near the upper side of the chamber 32 above the basket 36. These leaves and debris then are trapped or caught by the basket 36, from which they periodically can be removed.

Figure 2:
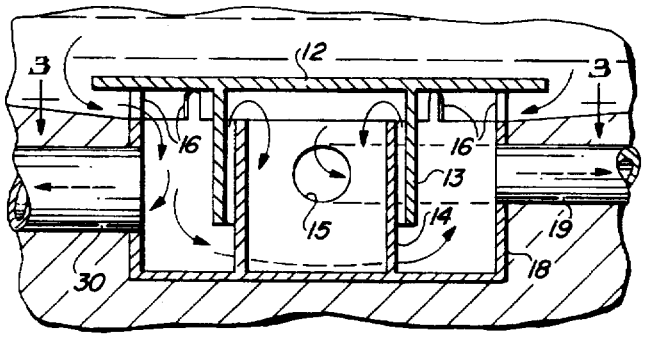
FIG. 2 is an enlarged cross-sectional view of a portion of the embodiment shown in FIG. 1.
Figure 3:
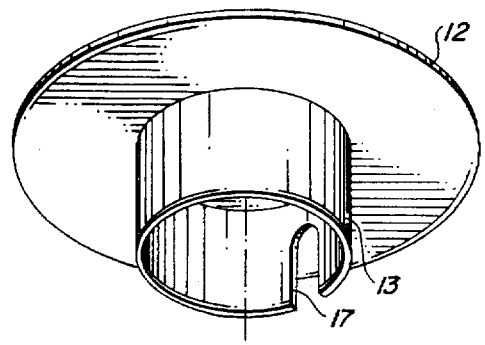
FIG. 3 is a top view taken along the line 3—3 of FIG. 2.
Figure 3:
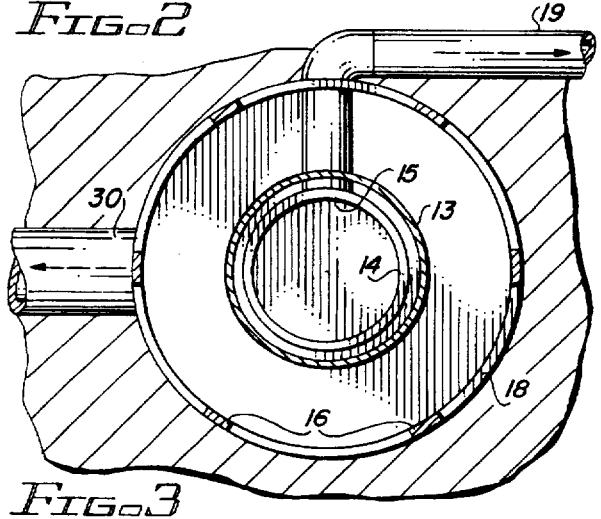
Figure 4:
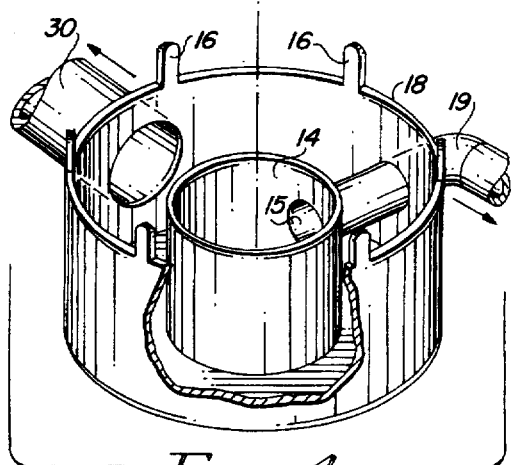
FIG. 4 is an exploded perspective view of the device shown in FIGS. 2 and 3.

An examination of FIGS. 2, 3 and 4 illustrates the manner in which the leaves and other debris are separated from the water which is supplied to the pipe 19. The largest portion of the water, which flows through the inlet of the drain 11 under the cover 12, flows into the outer chamber or compartment 18 into the space between the inner chamber 14 and the outer chamber 18 of the drain unit, and from this space into the pipe 30 for discharge into the basket 36. A smaller amount of water follows a much more tortuous path (to impede the passage of leaves and debris), as is readily apparent from an examination of FIG. 2. This water flows into the space between the chambers, and then upwardly through the relatively narrow space between the flange 13 and the outer wall of the inner chamber 14 before it exits through the opening 15 and into the pipe 19. Consequently, very little of the larger debris, such as leaves and the like, entering the outer chamber 18 from beneath the lid 12, passes through the baffle formed by the flange 13 and the upwardly extending walls 14 of the inner chamber to be pulled by the pump 20 into the recirculation portion of the pool system. The debris, instead, is pulled by the relatively large water flow through the pipe 30, to be deposited in the basket 36.

It should be noted that even if the basket 36 should be completely clogged with leaves and debris, because of failure of the person maintaining the pool to empty the basket 36, the water flow of the recirculation system produced by the pump 20, is not in any way diminished. This water flow is not dependent upon the flow of water through the pipe 30. As a consequence, the potential for damage of the pump 20 and the recirculating system is significantly reduced.

Reference now should be made to FIGS. 5 and 6. FIG. 5 is a cross-sectional view of another embodiment which can be used in place of the dual chamber pool drain housing embodiment shown in FIG. 2. In the embodiment shown in FIGS. 5 and 6, the outer chamber 18 is replaced with a corresponding outer chamber 50. The outer chamber 50 has an opening in it connected to the end of the pipe 30 corresponding to the similar connection between the outer chamber 18 of the embodiment of FIG. 2. In the embodiment of FIG. 5, however, the inner chamber does not extend from the bottom of the outer chamber, but instead is supported a substantial distance above the bottom, and constitutes a chamber 52, which is open at its top end and which has an opening in the side for connection to the pipe 19, as illustrated in FIG. 5. This chamber extends downwardly from an outwardly extending flange 54 comprising the primary portion of a cover over the drain opening. The flange 54 has a shoulder on it, which is supported by a support rib 58 (most clearly shown in FIG. 6) to thereby support the inner chamber 52 inside of and above the bottom of the outer chamber 50. The flange 54 extends beyond the edge of the open top of the outer chamber 50 to permit leaves and other debris to be drawn from along the bottom of the pool, below the lower edge of the flange 54, and then down into the interior of the chamber 50, and finally out through the pipe 30 to be deposited into the basket 36 (FIG. 1) as described above.

The water for recirculation in the pool is drawn from the pipe 19 under an auxiliary cover or top 55, which is supported by means supports 56, above the upper surface of the flange 54, in the manner shown most clearly in FIG. 5.

This water is the recirculation water; and it is readily apparent that as leaves move along the bottom of the pool, they are far more likely to be drawn under the flange 54 and into the chamber 50 than they are to be drawn over the top of the flange 54 and into the chamber 52. The device of FIGS. 5 and 6 operates in all other respects in the same manner, as far as the system is concerned, as the device shown in FIGS. 2, 3 and 4.

FIG. 7 illustrates yet another embodiment of the invention. The device of FIG. 7 is configured more closely to the device of FIG. 2. An outer chamber or compartment 68 corresponds to the outer chamber 18 of FIG. 2, and an inner chamber or compartment 70 corresponds to the inner chamber 14 of FIG. 2. Instead of pulling the water from the inner chamber 70 out through the side, however, it is supplied to the pipe 19 through an opening in the bottom. This same configuration could be used in the embodiment shown in FIGS. 2, 3 and 4. Also, the withdrawal of water through an opening in the side of the chamber 70, in the same manner as accomplished through the side wall of the chamber 14 of FIG. 2, could be substituted for the location of the pipe 19 shown in FIG. 7.

The primary difference between the device of FIGS. 7 and 8 and the one shown in FIGS. 2, 3 and 4, is that the cover or lid 76 is made to be movable from its lowermost position (as shown in FIG. 7) to other positions located at greater distances above the floor of the pool to adjust the opening available for the movement of leaves and other debris into the outer chamber 68 and, ultimately, through the pipe 30. This is accomplished by providing four sets of slots 71, 72, and 73 spaced at 90° intervals about the periphery of the inner chamber 70, as shown most clearly in FIG. 8. A downwardly depending flange 78 on the lid 76 has four alignment pins 80 located at 90° locations about the flange 78, and projecting inwardly, as shown in both FIGS. 7 and 8. By lifting the cover 76 and rotating it to the desired location, the pins 80 may be seated in any one of the four sets of three slots 71, 72 and 73 to position the cover as shown in FIG. 7, or to two higher positions with the pin 80 located in either the slots 72 or the slots 73, as desired. In all other respects, the device of FIGS. 7 and 8 operates in the system in the same manner described above in conjunction with the embodiments of FIGS. 2, 3 and 4, and the embodiment of FIGS. 5 and 6.

FIG. 9 illustrates a variation of the embodiment shown in FIG. 1 in the manner of the orientation of the discharge of the water return into the pool. The components shown in FIG. 9 are comparable to the components shown in the upper left-hand corner of FIG. 1, with the exception that the return pipe or nozzle 81 is directed upwardly instead of downwardly, as the return pipe 38 of FIG. 1. This may be used in some embodiments to cause movement of water near the top of the pool to be directed toward a leaf skimmer of the type shown in the Macia patent, for example, or any other type of leaf skimmer also provided for the pool in which the system disclosed and described above is used. In all other respects, the variation of the system shown in FIG. 9 operates in the same manner as described above.

Various changes and modifications will occur to those skilled in the art, without departing from the true scope of the invention. For example, three different embodiments of pool drain configurations have been illustrated and described. Other variations will occur to those skilled in the art. It also should be noted that it is not necessary for the water used for the recirculation system to be removed from a floor drain or from the same floor drain as the water which is circulated from the floor drain into the chamber 32. The pump 20 for the recirculating system could, if desired, withdraw water from other points in the pool which are not as susceptable to clogging by leaf and debris as the bottom drain 11. Various other changes and modifications will occur to those skilled in the art without departing from the true scope of the invention, as defined in the appended claims.

I claim:

1. An improved leaf and debris removal system for pools having a floor mounted drain and having a pool water recirculation system, said system including in combination:

a chamber having an upper end and a lower end, with a water inlet near said upper end and a water outlet near said lower end, said water outlet communicating with said pool for delivery of water thereto;

a leaf and debris catching strainer in said chamber for receiving water from said water inlet and capable of permitting water flow therethrough;

a pipe separate from said pool water recirculation system connected between the floor drain and said water inlet of said chamber;

water supply means for supplying water being recirculated under pressure from a return line of said pool water recirculation system;

entrainment nozzle means coupled with said water supply means for moving water through said water inlet and said pipe from the floor drain to mix water drawn from said drain with water from said water supply means to move leaves and debris along with water from the floor drain to deposit said leaves and debris in said strainer prior to the return of water to said water outlet, and therefrom to the pool.

2. The combination according to claim 1 wherein said water inlet and said water outlet of said chamber are located below the surface level of the water in the pool with which said chamber is associated.

3. The combination according to claim 2 wherein said pipe has in internal diameter sufficiently large to permit the passage of leaves and debris therethrough.

4. The combination according to claim 3 wherein the pool has a floor and the floor drain for the pool comprises a dual compartment drain housing located beneath the floor of the pool, said drain housing comprising an inner compartment and an outer compartment, with the outer compartment thereof connected to said pipe, and with the inner compartment thereof connected to a water recirculation system for the pool.

5. The combination according to claim 4 including means in said drain housing for minimizing the passage of leaves and debris through the water recirculation system of the pool, and for enhancing the passage of leaves and debris to said pipe connected to the water inlet of said chamber.

6. The combination according to claim 5 further including a cover for said drain housing, wherein said inner and outer compartments of said drain housing comprise concentric open-topped cylindrical sections, with the means for minimizing the passage of leaves and other debris to said inner compartment comprising a baffle connected to said cover, said baffle extending a predetermined distance downwardly from said cover, and spaced a predetermined distance from said inner compartment.

7. The combination according to claim 6 further including means for facilitating removal of said basket from said cavity to permit the removal of leaves and other debris therefrom.

8. The combination according to claim 7 wherein said water outlet from said chamber to the pool is oriented to direct the flow of water therefrom downwardly toward the drain in the pool.

9. The combination according to claim 1 wherein said water pipe has in internal diameter sufficiently large to permit the passage of leaves and debris therethrough.

10. The combination according to claim 1 further including means for facilitating removal of said basket from said chamber to permit the removal of leaves and other debris therefrom.

11. The combination according to claim 1 wherein said water pipe has in internal diameter sufficiently large to permit the passage of leaves and debris therethrough.

12. The combination according to claim 1 wherein said entrainment nozzle means further is coupled with said water outlet to draw water through said strainer from said water inlet prior to the return of such water through said entrainment nozzle means to said water outlet.

13. The combination according to claim 12 wherein said entrainment nozzle means is located in said chamber.

14. The combination according to claim 1 wherein said strainer is an open-topped basket located with the top thereof below said water inlet.

15. An improved leaf and debris removal system for a pool having a floor, said system including in combination:

a floor drain for the pool comprising a dual compartment drain housing located beneath the floor of the pool, said drain housing comprising an inner compartment and an outer compartment, with the inner compartment thereof connected to a water recirculation system for the pool;

a chamber having an upper end and a lower end, with a water inlet near said upper end and a water outlet near said lower end, said water outlet communicating with said pool for delivery of water thereto;

a leaf and debris catching strainer in said chamber for receiving water from said water inlet and capable of permitting water flow therethrough;

a water pipe connected between the outer compartment of said floor drain and said water inlet of said chamber;

water supply means for supplying water under pressure;

entrainment nozzle means coupled with said water supply means for moving water through said water inlet and said pipe from the floor drain to mix water drawn from said drain with water from said water supply means to move leaves and debris along with water from the floor drain to deposit said leaves and debris in said strainer prior to the return of water to said water outlet, and therefrom to the pool.

16. The combination according to claim 15 including means in said drain housing for impeding the passage of leaves and debris through the water recirculation system of the pool.

17. The combination according to claim 16 further including a cover for said drain housing, wherein said inner and outer compartments of said drain housing comprise concentric open-topped cylindrical sections, with the means for impeding the passage of leaves and other debris to said inner compartment comprising a baffle connected to said cover, said baffle extending a predetermined distance downwardly from said cover, and spaced a predetermined distance from said inner compartment.

18. The combination according to claim 17 wherein said water pipe has in internal diameter sufficiently large to permit the passage of leaves and debris therethrough.

* * * * *